United States Patent [19]

Toelle

[11] Patent Number: 5,735,117
[45] Date of Patent: Apr. 7, 1998

[54] STAGED FUEL INJECTION SYSTEM WITH SHUTTLE VALVE AND FUEL INJECTOR THEREFOR

[75] Inventor: Alvin D. Toelle, Holland, Mich.

[73] Assignee: Fuel Systems Textron, Inc., Zeeland, Mich.

[21] Appl. No.: 516,862

[22] Filed: Aug. 18, 1995

[51] Int. Cl.⁶ ............................................. F02G 3/00
[52] U.S. Cl. ........................... 60/39.094; 60/740; 60/739
[58] Field of Search .......................... 60/39.094, 740, 60/739, 734

[56] References Cited

U.S. PATENT DOCUMENTS

| | | | |
|---|---|---|---|
| 2,846,845 | 8/1958 | Parker | 60/39.094 |
| 2,949,736 | 8/1960 | Rubbra | 60/39.32 |
| 3,344,602 | 10/1967 | Davies et al. | 60/39.28 |
| 3,684,186 | 8/1972 | Helmrich | 239/400 |
| 3,750,396 | 8/1973 | Tucker | 60/739 |
| 4,041,695 | 8/1977 | Harper et al. | 60/39.02 |
| 4,066,386 | 1/1978 | Johnson et al. | 417/199 |
| 4,170,108 | 10/1979 | Mobsby | 60/39.74 |
| 4,339,636 | 7/1982 | Donnelly et al. | 60/734 |
| 4,344,280 | 8/1982 | Minakawa et al. | 60/39.094 |
| 4,423,595 | 1/1984 | McLean | 60/261 |
| 4,464,901 | 8/1984 | Kobayashi et al. | 60/606 |
| 4,590,768 | 5/1986 | Halvorsen et al. | 60/739 |
| 4,614,202 | 9/1986 | Halvorsen et al. | 137/118 |
| 4,903,478 | 2/1990 | Seto et al. | 60/39.281 |
| 4,964,270 | 10/1990 | Taylor et al. | 60/39.094 |
| 4,984,424 | 1/1991 | Shekleton | 60/39.94 |
| 5,095,694 | 3/1992 | Shekleton et al. | 60/39.094 |
| 5,129,222 | 7/1992 | Lampe et al. | 60/39.094 |
| 5,243,816 | 9/1993 | Huddas | 60/39.094 |
| 5,269,468 | 12/1993 | Adiutori | 60/740 |
| 5,277,023 | 1/1994 | Bradley et al. | 60/39.094 |
| 5,417,054 | 5/1995 | Lee et al. | 60/39.094 |
| 5,442,922 | 8/1995 | Dyer et al. | 60/740 |

FOREIGN PATENT DOCUMENTS 9415084   7/1994   WIPO.

*Primary Examiner*—Timothy Thorpe
*Assistant Examiner*—Ted Kim
*Attorney, Agent, or Firm*—Edward J. Timmer

[57] ABSTRACT

A fuel injection system for a gas turbine engine combustion chamber comprises at least one pilot fuel injector having a fuel discharge passage communicated to the combustion chamber and at least one secondary fuel injector having a fuel discharge passage communicated to the combustion chamber and a fuel purging passage communicated to a higher pressure region upstream of the combustion chamber. A fuel flow control device supplies metered fuel flow to the pilot fuel injector under all regimes of engine operation and to the secondary fuel injector under certain, intermittent regimes of engine operation requiring fuel flow above a selected level. A shuttle valve is movable to a first position to provide fuel flow communication between the fuel control device and the fuel discharge passage of the secondary fuel injector for fuel injection to the combustion chamber. The shuttle valve also is movable to a second position to communicate the fuel discharge passage and the fuel purging passage of the secondary injector to the higher pressure region to purge fuel from the fuel discharge passage to the combustion chamber.

15 Claims, 6 Drawing Sheets

STAGED FUEL INJECTION SYSTEM WITH SHUTTLE VALVE AND FUEL INJECTOR THEREFOR

FIELD OF THE INVENTION

The present invention relates to a fuel injection system for a gas turbine engine and, more particularly, to a fuel injection system having fuel staging and fuel purging capability.

BACKGROUND OF THE INVENTION

Airblast fuel injectors have been proposed for use in a staged gas turbine engine fuel systems. Airblast fuel injectors are described in the Helmrich U.S. Pat. No. 3,864,186 and others and are designed to achieve atomization of a film of liquid fuel formed on a fuel discharge surface or lip by directing high velocity airflow from the engine compressor at the fuel film as it leaves the orifice surface.

Airblast fuel injectors have been proposed for use in a staged gas turbine engine fuel system. However, use of airblast fuel injectors in a staged fuel system may present so-called coking problems when the airblast fuel injectors comprise the secondary (or main) injectors of the system that are rendered non-operative during some engine regimes (e.g. low engine power regimes such as low speed idle operations) and operative during other engine regimes (e.g. high speed operations). In particular, when the secondary fuel injectors are rendered non-operative during low power operation, fuel remains in the fuel discharge passages of the injectors and can be heated by the elevated temperature of the combustor environment to the extent that the fuel in the fuel discharge passages is carbonized or coked over time, building up carbonaceous deposits therein. These deposits can adversely affect the performance of the airblast fuel injectors in service from the standpoint that injector fuel flow rate and fuel atomization become unsatisfactory. Similar deposits may build-up in the fuel passages of other air atomizing fuel injectors, such as hybrid pressurizing/airblast injectors, that employ high velocity compressor airflow to atomize fuel discharged from a fuel discharge passage/lip.

U.S. Pat. No. 5,277,023 of common assignee herewith discloses a self-sustaining, fuel purging fuel injection system that employs a purging pressure differential established on fuel residing in interconnected fuel discharge passages of the injectors effective to purge fuel from the fuel discharge passages when the injectors become non-operative. The purging pressure differential is established at the fuel discharge lips of the injectors by controlled geometrical/air flow relationships between air/fuel lips of the injectors, rather than by inherent pressure differentials relative to the engine combustor.

It is an object of the present invention to provide a fuel injection system for a gas turbine engine wherein the system is provided with secondary or main fuel staging and purging capabilities wherein a pressure differential is used for purging and wherein purging is controlled by a purge valve referenced to pilot fuel inlet pressure.

It is an object of the present invention to provide a fuel injection system for a gas turbine engine wherein the system is provided with secondary or main fuel staging and purging capabilities wherein a pressure differential is used for purging and wherein purging is controlled by a purge valve in turn controlled by a three-way servo-controlled valve.

It is another object of the invention to provide a fuel injector having a shuttle valve for providing a fuel injection mode or fuel purging mode.

SUMMARY OF THE INVENTION

The present invention provides a fuel injection system for a gas turbine engine combustion chamber comprising at least one pilot fuel injector communicated to the combustion chamber for discharging primary fuel thereto and at least one secondary (main) fuel injector having a fuel discharge passage communicated to the combustion chamber for discharging staged secondary fuel thereto and a fuel purging passage communicated to a purge air pressure source, such as a air plenum region upstream of the combustion chamber. Fuel flow control means supplies fuel flow to the pilot fuel injector(s) under all regimes of engine operation and to the secondary fuel injector(s) under certain higher power regimes of engine operation requiring fuel flow above a selected fuel flow level or rate.

A purge valve is provided and movable to a first position to provide fuel flow communication between the fuel control means and the fuel discharge passage of the secondary fuel injector for fuel injection to the combustion chamber. The purge valve also is movable to a second position to communicate the fuel discharge passage and the fuel purging passage of the secondary injector to the purge air pressure source to purge fuel from the fuel discharge passage to the combustion chamber.

The purge valve is communicated at all times to pilot inlet fuel pressure as a reference biasing pressure and also is biased by spring means in a manner to position the purge valve at the second purging position when fuel flow to the secondary injector is controlled below the selected fuel flow level or interrupted. The purge valve is communicated to secondary fuel inlet pressure when fuel flow thereto exceeds the selected level such that the secondary fuel pressure on the purge valve overcomes the pilot fuel inlet pressure and the spring means to position the purge valve at the first injection position.

The purge valve typically comprises a shuttle valve movable in a valve sleeve or body with the shuttle valve and valve sleeve having mating planar sealing surfaces providing metal-to-metal sealing without resilient elastomeric seals. The pilot fuel inlet pressure is communicated to a first region of the shuttle valve which is also biased by the spring means. The secondary fuel inlet pressure is communicated to a second, opposite region of the shuttle valve when the secondary injectors are staged.

A relatively small bypass cooling fuel flow can be provided from a fuel splitter valve to the secondary fuel injector and then to the pilot fuel injector when the shuttle valve is positioned in the second purging position for discharge from the pilot injector to the combustion chamber.

The fuel control means typically includes the fuel splitter valve to proportion fuel flow between the pilot injector(s) and the secondary injector(s). When multiple sets of pilot injectors and secondary injectors are used, a pilot flow distribution valve and secondary flow distribution valve can be used to meter equal fuel flows to to the pilot injectors and to the secondary injectors, respectively.

The present invention also provides a fuel injector for a gas turbine engine comprising injector housing means having a fuel discharge passage communicated to a combustion chamber and a fuel purge passage communicated to a source of purge air and a shuttle valve disposed in the housing means and movable to a first fuel injection position where the fuel discharge passage is communicated to a source of fuel and second fuel purging position where the fuel discharge passage and the purge passage are communicated by the shuttle valve to purge fuel residing in the fuel discharge passage to the combustion chamber. Spring means is provided for biasing the shuttle valve to the second purging position and fuel supply means is provided for providing fuel pressure counter to the spring means to move the shuttle valve to the fuel injection position.

The present invention provides in another embodiment a fuel injection system for a gas turbine engine combustion chamber wherein a three-way servo-controlled valve acts as pilot to control a shuttle valve between a fuel injection position and fuel purging position.

The fuel injection systems of the present invention provide a fuel injection capability wherein the secondary fuel injectors can be intermittently staged as needed for higher power engine operating regimes and wherein the secondary fuel injectors can be purged of resident fuel using a pressure differential across the combustion chamber when they are rendered inoperative.

DETAILED DESCRIPTION OF THE INVENTION

Figure 2:
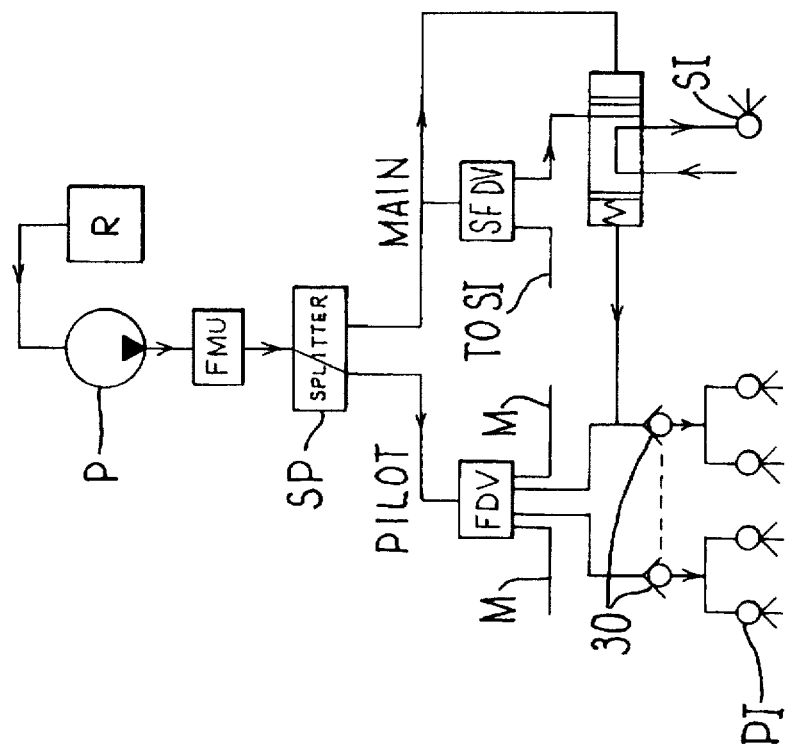
FIG. 2 is a schematic illustration of a fuel injection system in accordance with an embodiment of the invention and shown in the fuel purging mode.

Referring to FIGS. 1–4, a fuel injection system for a gas turbine engine combustion chamber in accordance with an embodiment of the invention is schematically illustrated. The fuel injection system includes one or more pilot fuel injectors PI and one or more secondary fuel injectors SI operatively associated with an annular combustor 10 of a gas turbine engine, FIG. 4. The combustor 10 typically is disposed inside an engine duct 11 for receiving pressurized (superambient pressure) discharge air from an air supply plenum 12 (air supply means) which communicates with the engine compressor (not shown) located upstream of the combustor 10 in conventional manner. The fuel injection system is illustrated in FIGS. 1–4 including the pilot fuel injector PI mounted on the engine duct 11 to provide pilot fuel to the combustion chamber 10a of the combustor at all regimes of engine operation and secondary fuel injector SI mounted on the engine duct 11 to provide secondary fuel to the combustion chamber 10a at intermittent high power (high speed) regimes of engine operation requiring higher fuel flow.

Although not shown for convenience, additional pilot fuel injectors PI and secondary fuel injectors SI typically are used and arranged circumferentially about the periphery of the engine duct 11 and combustor 10 to this end. The pilot injectors PI typically are arranged circumferentially in a common transverse plane about the combustor 10 at an upstream location relative to the secondary injectors SI that are arranged circumferentially in a common transverse plane downstream thereof as illustrated schematically in FIGS. 1–2 and also in U.S. Pat. No. 5,277,023 of common assignee herewith, the teachings of which are incorporated herein by reference with respect to location of the pilot (primary) injectors and secondary (main) injectors relative to the combustor.

The pilot injectors PI and secondary fuel injectors SI are supplied with fuel from a fuel reservoir R by a conventional fuel pump P, conventional fuel lines (conduits) and fuel manifolds, and a fuel metering unit FMU, which can comprise a closed loop, electronic feedback-controlled servo fuel metering unit. The fuel flow is split or proportioned by a fuel splitter valve SP between pilot injector(s) PI and secondary injector(s) SI in response to a main (secondary) fuel flow injection command received from a full authority digital engine control (FADEC) system (not shown). The splitter valve SP also diverts a relatively small cooling fuel flow (e.g. 10% to 50% of pilot flow) to the pilot injectors PI when the purge valve is positioned in the purging position as will be explained herebelow. The splitter valve SP comprises a conventional remotely located splitter valve comprising a closed loop electronic servo-controlled fuel meter unit with feedback which proportions fuel to the pilot and secondary injector systems on selective command from the aforementioned FADEC system.

When a plurality of pilot injectors PI are employed in the practice of the invention, the pilot fuel flow from the splitter valve SP is distributed equally among the injectors PI from a pilot fuel manifold by a fuel flow distribution valve FDV, providing accurate metered flow to each or a pair of pilot injectors. The fuel flow distribution valve FDV may be a distribution valve of the type used on the PW 2057 gas turbine engine sold by Pratt & Whitney Aircraft Division of United Technologies Corporation, or a fuel distribution valve of the type described in U.S. Pat. Nos. 4,612,202 and 4,590,768, the teachings of which are incorporated herein by reference. The invention is not limited to any particular fuel distribution valve in the event a plurality of pilot injectors are present. Optional check valves 30 can be disposed in the fuel lines from the fuel flow distribution valve FDV to the pilot injectors PI to prevent fuel drainage from the pilot fuel manifold(s) M to the combustor.

When a plurality of secondary (main) injectors SI are employed in the practice of the invention, the secondary fuel from the splitter valve SP likewise is distributed equally to the injectors SI by a secondary fuel flow distribution valve SFDV of the same type as described hereabove for pilot fuel flow distribution. The secondary flow distribution valve SFDV provides via its discharge ports accurate metered flow adjustment at maximum flow conditions to each or a pair of secondary pilot injectors. The invention also can be practiced using a suitable fuel flow distribution valve incorporated integrally as part of the respective pilot injectors PI and secondary injectors SI.

The pilot fuel injector(s) PI can each comprise a conventional airblast fuel injector of the type described in the Helmrich U.S. Pat. No. 3,864,186, the teachings of which are incorporated herein by reference to this end, or a conventional pressure atomizing fuel injector, although the invention is not limited to any partcular pilot fuel injector. As is known, airblast pilot fuel injector PI includes a discharge end disposed in the combustor 10 (in a similar manner as shown in FIG. 4 and described herebelow for the secondary injector SI) for discharging a primary fuel spray from an annular fuel discharge passage and associated fuel discharge lip and inner and outer air atomizing air flow from respective inner and outer air discharge passages and associated inner and outer air discharge lips.

Figure 1:
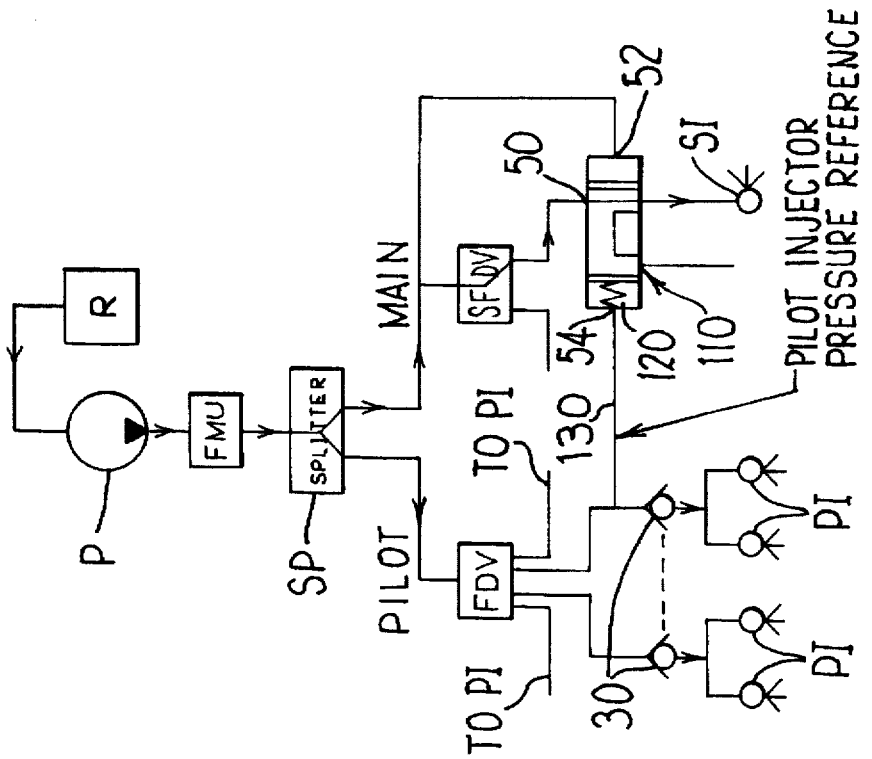
FIG. 1 is a schematic illustration of a fuel injection system in accordance with an embodiment of the invention and shown in the fuel injection mode.
Figure 3:
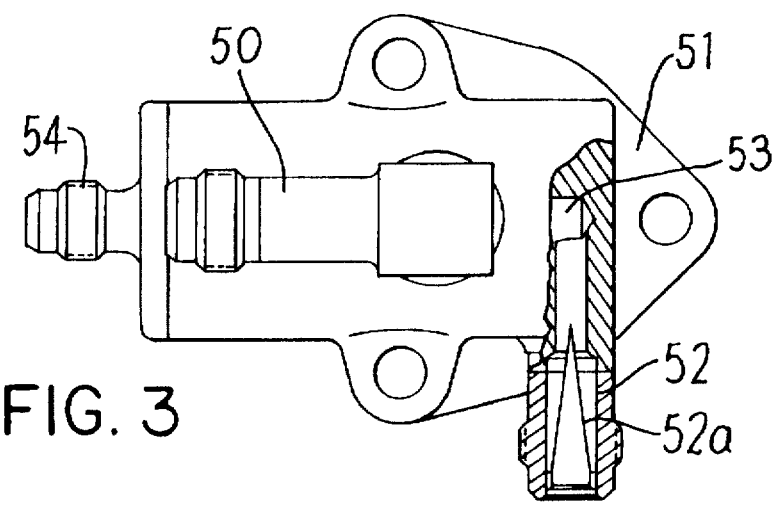
FIG. 3 is a plan view partially in section, of a secondary (main) fuel injector useful in practicing the invention.
Figure 4:
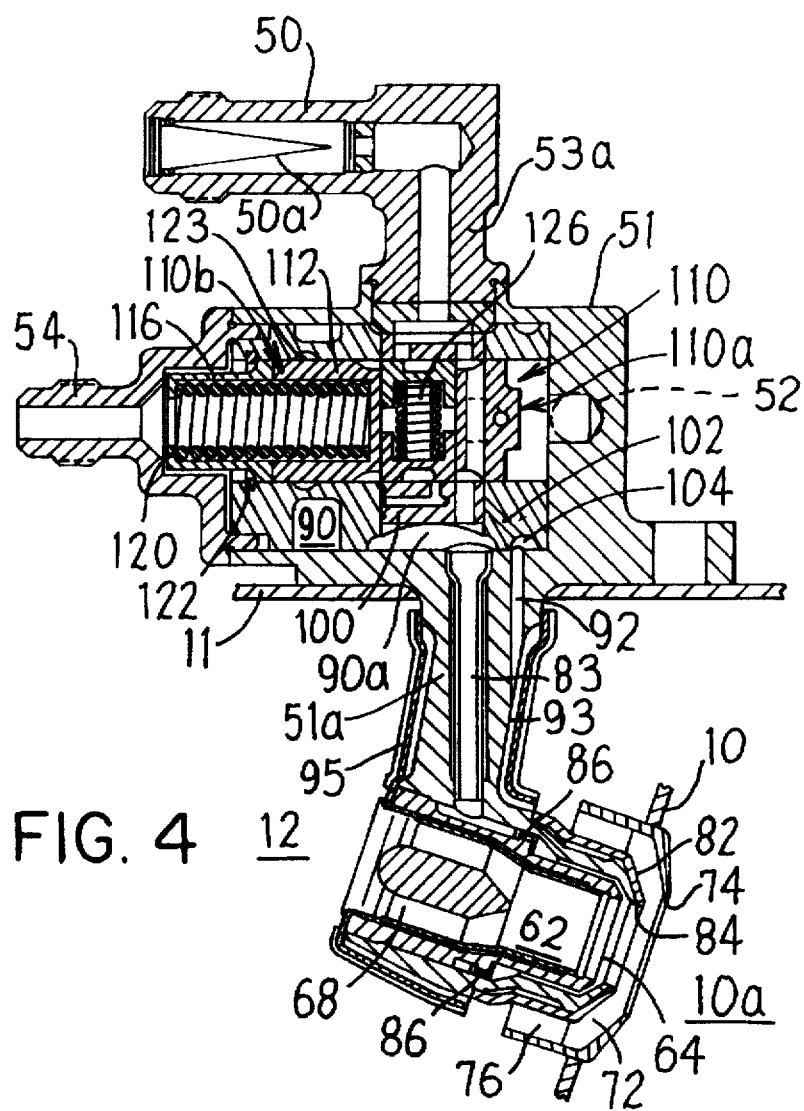
FIG. 4 is a sectional view of a secondary (main) fuel injector useful in practicing the invention and showing the purge valve in a fuel injection position.
Figure 5:
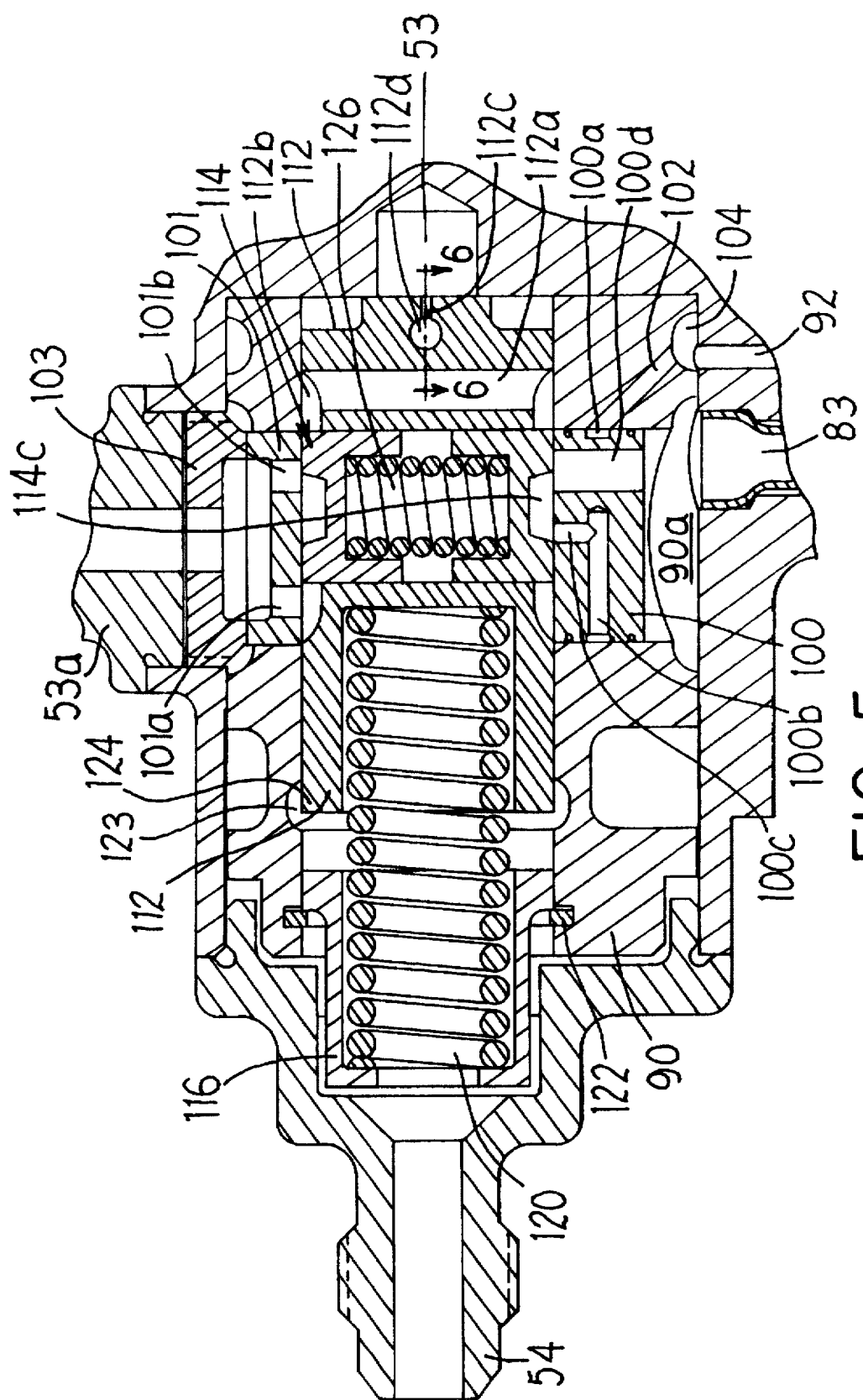
FIG. 5 is an enlarged, fragmentary view of the secondary fuel injector showing the shuttle valve in a fuel purging position.

A secondary fuel injector SI of the present invention is shown in FIGS. 3-5. The secondary injector SI comprises a first inlet or port 50 with fuel filter 50a and trim orifice on an injector housing 51. The port 50 is communicated to the secondary fuel distribution valve SFDV to receive metered secondary fuel flow therefrom. A second inlet or port 52 with fuel filter 52a is provided on the housing 51 and is communicated to the splitter valve SP so that fuel pressure at the splitter valve SP (pressure at inlet to the secondary fuel distribution valve SFDV) is present at inlet or port 52 and communicated to end region 110a of the shuttle purge valve 110 via bore 53. A third inlet or port 54, which may include a fuel filter (not shown-see 54a in FIG. 8), is provided on the injector housing and communicates to the pilot fuel inlet line or conduit 130 as shown in FIGS. 1-2 so that pilot fuel inlet pressure is present at the inlet or port 54 and communicated to second, opposite end region 110b of the shuttle purge valve 110.

The secondary fuel injector SI includes an inner air chamber 62 that receives pressurized air flow from the air plenum 12 and discharges the air flow from inner air discharge lip 64 to the combustion chamber 10. Circumferentially spaced inner air swirl vanes 68 are present in the air chamber 62 in conventional manner to impart swirl to the air flowing therethrough. An outer air chamber 72 is also provided and receives pressurized air flow from the plenum 12 for discharge from outer air discharge lip 74. Circumferentially spaced outer air swirl vanes 76 are present in the air chamber 72 in conventional manner to impart swirl to the outer air flowing therethrough.

An annular fuel discharge passage 82 is provided and receives secondary fuel from the fuel supply tube 83 in the injector housing strut portion 51a that is communicated to the purge valve 110. Circumferentially spaced fuel swirl vanes 86 are present in the fuel discharge passage 82 in conventional manner to impart swirl to the fuel flowing therethrough. The fuel passage terminates in a fuel discharge lip 84 for discharging fuel to the combustion chamber 10 between the inner and outer air flows discharged from lips 64, 74 for fuel atomization.

The secondary fuel injector SI also includes a fuel purging passage 92 extending through the strut portion 51a communicating at one end to the purge valve 110 and at the other end to a space 93 defined between the strut housing portion 51a and a heat shield 95. The space 93 communicates to the air plenum 12 which receives pressurized air from the engine compressor. The fuel purging passage 92 thus communicates to a relatively high pressure air source as compared to the fuel discharge lip 84, which communicates to the combustion chamber 10 that is at a lower air pressure source as a result of the pressure drop across the combustor 10. Thus, there is pressure differential between the purging passage 92 and fuel discharge lip 84 that is used to purge resident fuel from the fuel supply tube 83 and fuel discharge passage 82 to the combustion chamber when the secondary injectors SI are inoperative to discharge secondary fuel thereto.

As best shown in FIG. 5, the purge valve 110 is received in the injector housing 51 which is welded to the housing strut portion 51a and the inlet or port fitting 53a. The purge valve 110 comprises a fixed, tubular valve sleeve 90 disposed in the housing 51 and having a cylindrical, axial inner bore. The sleeve 90 has a purge port plate 100 brazed therein and includes a purge passage 102 and recessed purge land 104 machined therein. The purge land 104 communicates with the purging passage 92 in the housing strut portion 51a. The purge plate 100 includes an annular purge chamber 100a that communicates with the purge passage 102. The chamber 100a communicates with a first drilled purge passage 100b and a second drilled purge passage 100c in the purge plate 100. The purge passage 100c can communicate with the fuel supply tube 83, FIG. 5, as permitted by the movable shuttle purge valve 110 as will be explained to effect fuel purging. The purge plate 100 also includes a fuel passage 100d.

A flat adjustment plug or disc 101 is slip fit in the valve sleeve 90 adjacent a threaded adjustment member 103 in the injector housing for mating with sealing shoe 114 and adjustment of sealing pressure with shoe 114. The disc 101 includes first and second fuel ports or fuel access holes 101a and 101b which eliminate the need to preferentially orient the plug 101.

The shuttle purge valve comprises a movable metering spool 112 disposed in the axial bore of the sleeve 90, seal shoe 114 in the spool for movement therewith, fixed spring sleeve 116, and valve spring 120. The spring sleeve 116 is retained against axial movement toward the inlet or port 54 by a retainer clip 122.

A coil page spring 126 is disposed between cylindrical shape shoe halves of shoe 114 and provides sealing pressure of the outer flat, planar sealing surfaces of sealing shoe halves against inner, flat, planar surfaces of purge plate 100 and disc or plug 101 to provide line-to-line, metal-to-metal surface contact to avoid the need for elastomeric seals in the purge valve. A recess or chamber 114c is provided on the outer periphery of the halves of shoe 114 and separates the outer, flat shoe sealing surfaces as shown.

Figure 6:
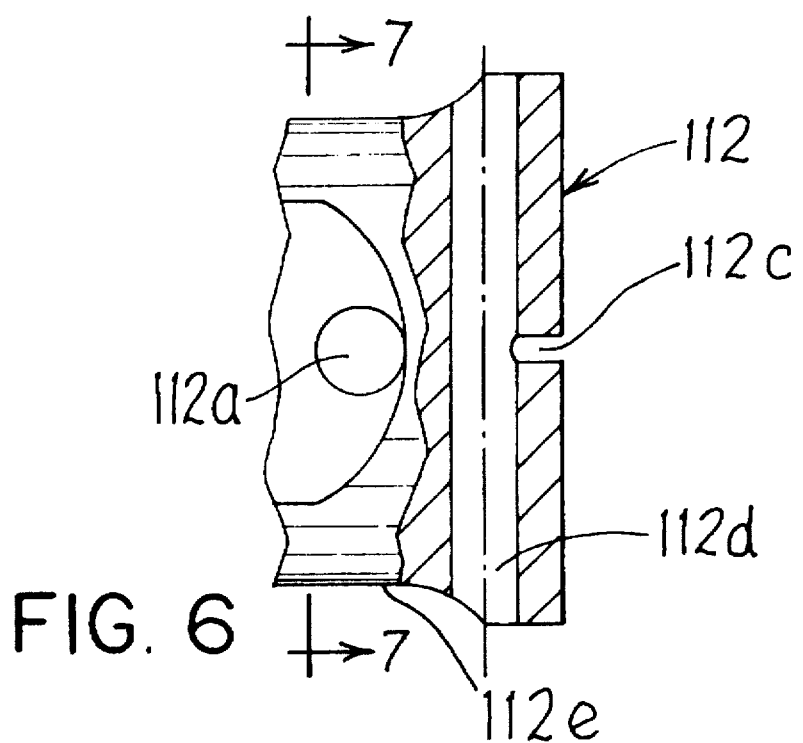
FIG. 6 is a partial sectional view of the metering spool.
Figure 7:
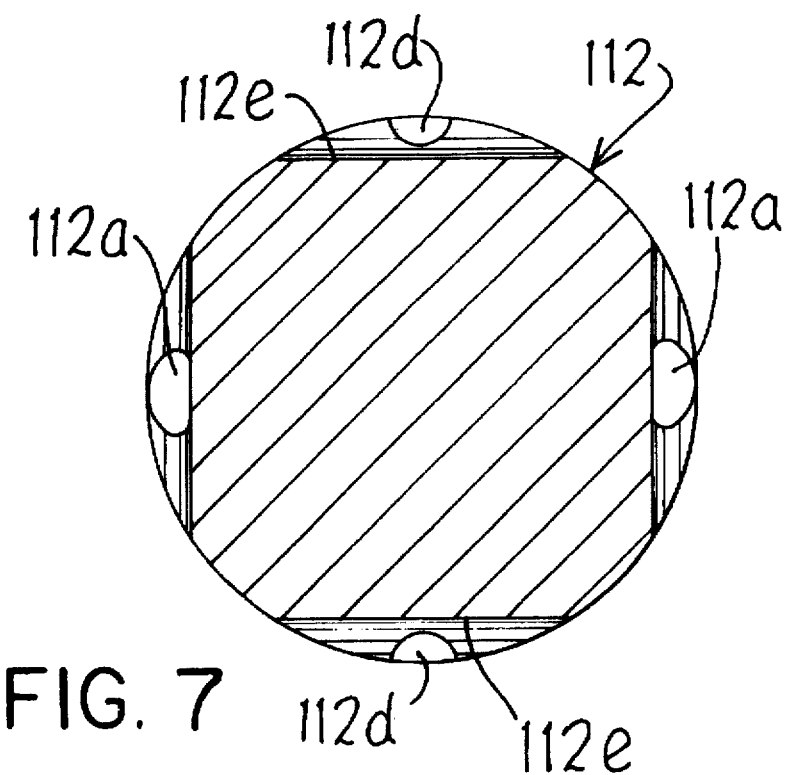
FIG. 7 is a sectional view of the metering spool.

The metering spool 112 comprises a transversely extending fuel passage 112a having recessed end lands 112b, an axially extending trim orifice 112c for bypass fuel cooling flow and a fuel cooling passage 112d communicated thereto and extending transversely thereof and of the passage 112a. Trim orifice 112c preferably extends into communication with passage 112a to prevent spool lock-up, although not shown for convenience. Transverse passage 112d in turn communicates to axially extending outer cooling fuel flow recesses 112e on the spool 112, FIGS. 6-7. The recesses 112e provide bypass cooling fuel flow to the annular passage 123. The bypass cooling fuel flow passes through the gap between the spool 112 and sleeve 116 for exit through port 54 when the purge valve 110 is in the purging position, FIG. 5. Spool surface 124 closes off passage 123 to terminate bypass cooling fuel flow as spool 112 moves to stop on or engagement with the end of sleeve 116 when the purge valve 110 is in the injection position, FIG. 4.

The shuttle purge valve 110 is movable to a first fuel injection position, FIG. 4, where the valve spool 112 engages the end of spring sleeve 116 and where the fuel inlet or port 50 is communicated with the fuel supply tube 83 and fuel discharge passage 82 of the secondary fuel injector SI for staged secondary fuel injection to the combustion chamber 10a. In particular, fuel is supplied to passage 112a of the metering spool 112 and then to the fuel passage 100d of the purge plate. The fuel passage passage 100d in turn communicates to the fuel chamber 90a of valve sleeve 90, the chamber 90a communicating with the fuel supply tube 83 to supply fuel to the fuel discharge passage 82 of the secondary fuel injector. In the fuel injection position of the shuttle valve 110, secondary fuel from the secondary fuel distribution valve SFDV is discharged to the combustion chamber for higher power engine regimes.

In the first fuel injection position, the purging passage 102 of the valve sleeve 90 is prevented from communicating with the purge passage 100c of the purge plate 100 by outer, flat, planar sealing surface of the shoe 114 as illustrated in FIG. 4.

The shuttle purge valve 110 is movable to a second fuel purging position, FIG. 5, where the valve spool 112 is spaced from the spring sleeve 116 and where the fuel supply tube 83 is communicated with the fuel purging passage 102 of the valve sleeve 90 by the purge chamber 100a and purge passages 100b-100c of the purge plate 100 and chamber 114c of the shoe 114 to purge fuel residing in the supply tube 83 and fuel discharge passage 82 of the secondary fuel injector SI for fuel injection to the combustion chamber. In particular, the chamber 114c of the shoe 114 communicates the fuel purge passage 100c and the fuel purging passage 102 such that relatively high pressure purge air flows through purge passage 92, purge land 104, purge passage 102 and then through purge chamber 100a. The purge chamber 100a communicates with purge passages 100b-100c such that purge air flows through fuel passage 100d of the purge plate, fuel chamber 90a of the valve sleeve 90, and then the fuel supply tube 83 and out of the fuel discharge passage 82 of the injector to purge fuel to the combustion chamber 10a. In the fuel purging position of the shuttle valve 110, secondary fuel is thereby purged from the secondary fuel injector SI to the combustion chamber at low power engine regimes.

In the second purging position, the fuel passage 112a of the metering spool 112 is prevented by a sealing surface of shoe 114 from communicating with the fuel passage 100d to prevent secondary fuel flow to the fuel injector SI, FIG. 5. However, bypass cooling fuel flow from the splitter valve SP bypassing valve SFDV flows through the port 52 into bore 53 and then through bypass cooling fuel orifice/passage 112c, 112d, etc. to passage 123 and through the gap between the spool 112 and spring sleeve, FIG. 5, and out of the port 54 via a fuel conduit 130 to the fuel inlet line of the pilot injector PI as shown in FIGS. 1-2. The bypass cooling fuel flow thereby passes through the secondary injector SI for cooling purposes and then to the pilot fuel injector PI for discharge to the combustion chamber.

In operation of the purge valve 110, the first fuel injection position is achieved in response to a main (secondary) fuel flow injection command received from the aforementioned FADEC system. The command causes the splitter valve SP to increase the proportion of fuel flow to the secondary fuel distribution valve SFDV to exceed the cooling fuel flow otherwise provided. The additional fuel flow causes the pressure drop of the valve SFDV to exceed the valve cracking pressure to open the valve. The increased splitter fuel pressure at the inlet to valve SFDV increases the fuel pressure at the inlet or port 52 and bore 53 and thus on the end region 110a of the shuttle valve 110 relative to the pilot fuel inlet pressure at port 54 as a reference pressure and spring force from valve spring 120. The additional fuel pressure acts on the shuttle valve 110 and overcomes the force of valve spring 120 and the reference pilot fuel inlet pressure at port 54 to move the shuttle valve 110 to the first fuel injection position.

On the other hand, in response to a main (secondary) fuel flow shut-down/purge command received from the FADEC system, the splitter valve SP reduces the proportion of fuel flow to the valve SFDV to the relatively small fuel cooling flow. This reduced fuel flow results in reduced fuel pressure at port 52 relative to the pilot fuel inlet pressure at port 54 and spring force from valve spring 120. The reduced fuel pressure at port 52 and bore 53 is insufficient to overcome the valve return spring 120 and pilot fuel inlet pressure at port 54 such that the spool 112 slides the shoe 114 to communicate purge passage 102, purge chamber 100a/purge passages 100b-100c with passage 100d and also to block fuel flow to fuel passages 112a and 100d.

The splitter valve SP provides the relatively small cooling fuel flow to the valve SFDV and port 52 of the secondary injector SI when the shuttle valve 110 is positioned in the second purging position as explained hereabove.

In operation, the shuttle valve 110 thus is communicated at all times to pilot inlet fuel pressure as a reference pressure at port 54 and biased by spring 120 in a manner to position the shuttle valve at the second purging position when fuel flow to the secondary injector SI is reduced below the selected level to crack valve SFDV and is communicated to secondary fuel inlet pressure when fuel flow thereto exceeds the selected level such that the secondary fuel pressure on the shuttle valve 110 overcomes the pilot fuel inlet pressure and the spring 120 to position the shuttle valve at the first fuel injection position.

Figure 9:
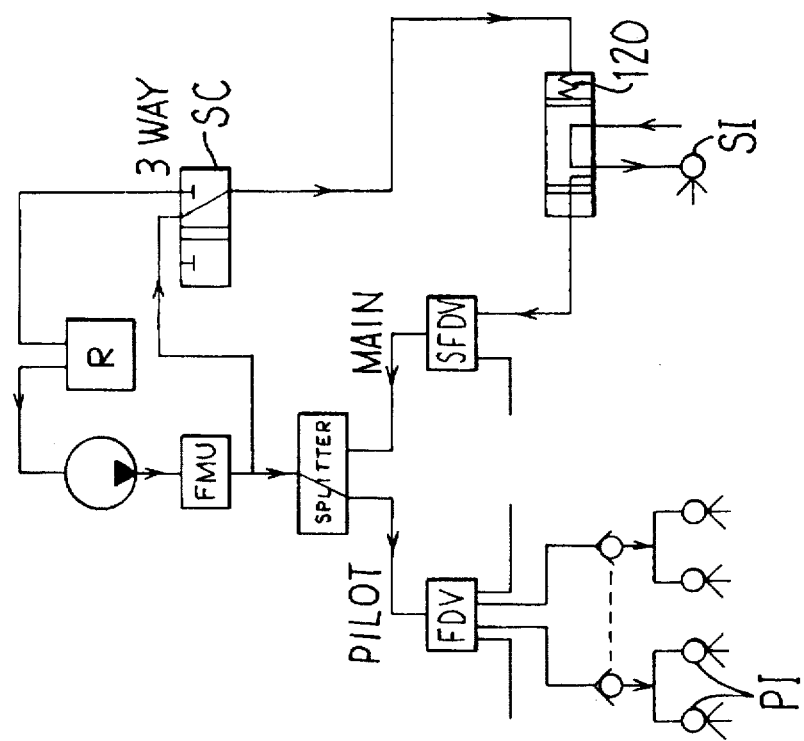
FIG. 9 is a schematic illustration of the fuel injection system in accordance with FIG. 8 shown in the fuel purging mode.
Figure 8:
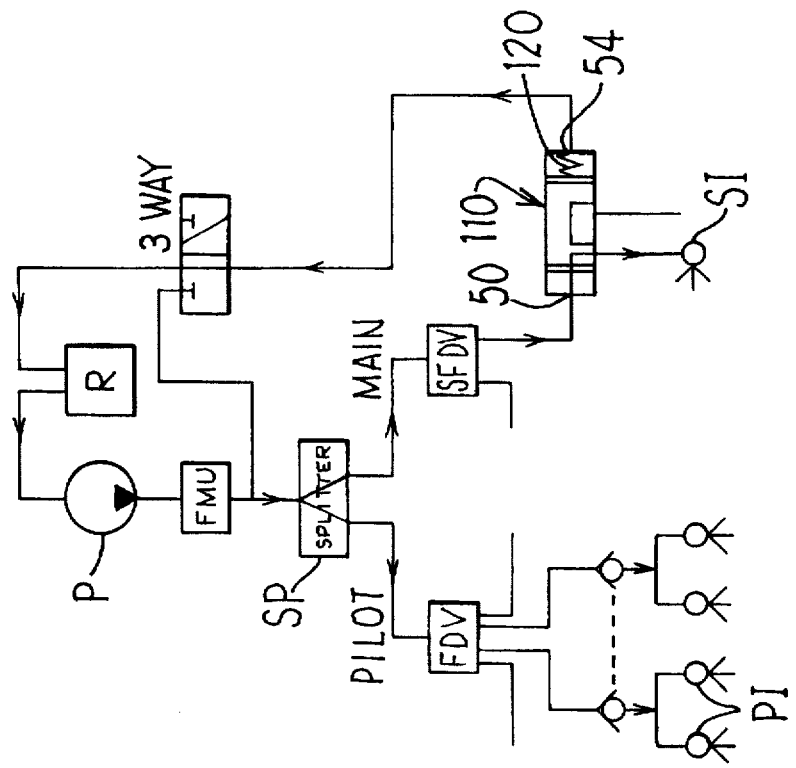
FIG. 8 is a schematic illustration of a fuel injection system in accordance with an embodiment of the invention and shown in the fuel injection mode.
Figure 10:
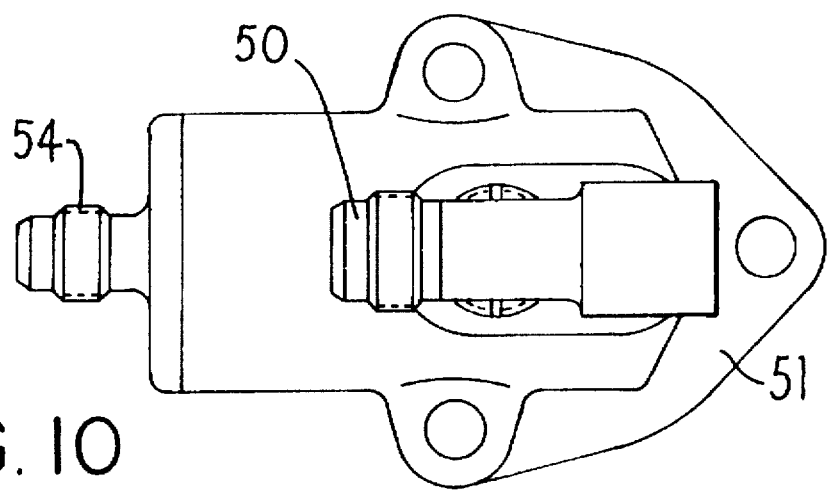
FIG. 10 is a plan view of a secondary (main) fuel injector useful in practicing another embodiment of the invention.

Referring to FIGS. 8-9, a fuel injection system for a gas turbine engine combustion chamber in accordance with another embodiment of the invention is schematically illustrated. The fuel injection system includes one or more pilot fuel injectors PI and one or more secondary fuel injectors SI operatively associated with an annular combustor 10 of a gas turbine engine. In FIGS. 8-9, like features of FIGS. 1-2 are represented by like reference numerals.

The embodiment of FIGS. 8-9 differs from that of FIGS. 1-2 in including a three-way servo controlled valve SC to port to the fuel return or reservoir R to position the shuttle valve 110 in the fuel injection position and to port to the splitter valve pressure to position the shuttle valve 110 in the fuel purging position.

The secondary fuel injector SI differs from that of FIGS. 3-5 in having only an inlet or port 50 communicated to the secondary flow distribution valve SFDV and an inlet or port 54 communicated to the three-way servo-controlled valve SC. There is no inlet or port 52 communicated directly to the splitter valve SP. Moreover, the metering spool 112 of the shuttle valve 110 differs in having fuel passage configuration 150 shown in FIG. 11.

Figure 11:
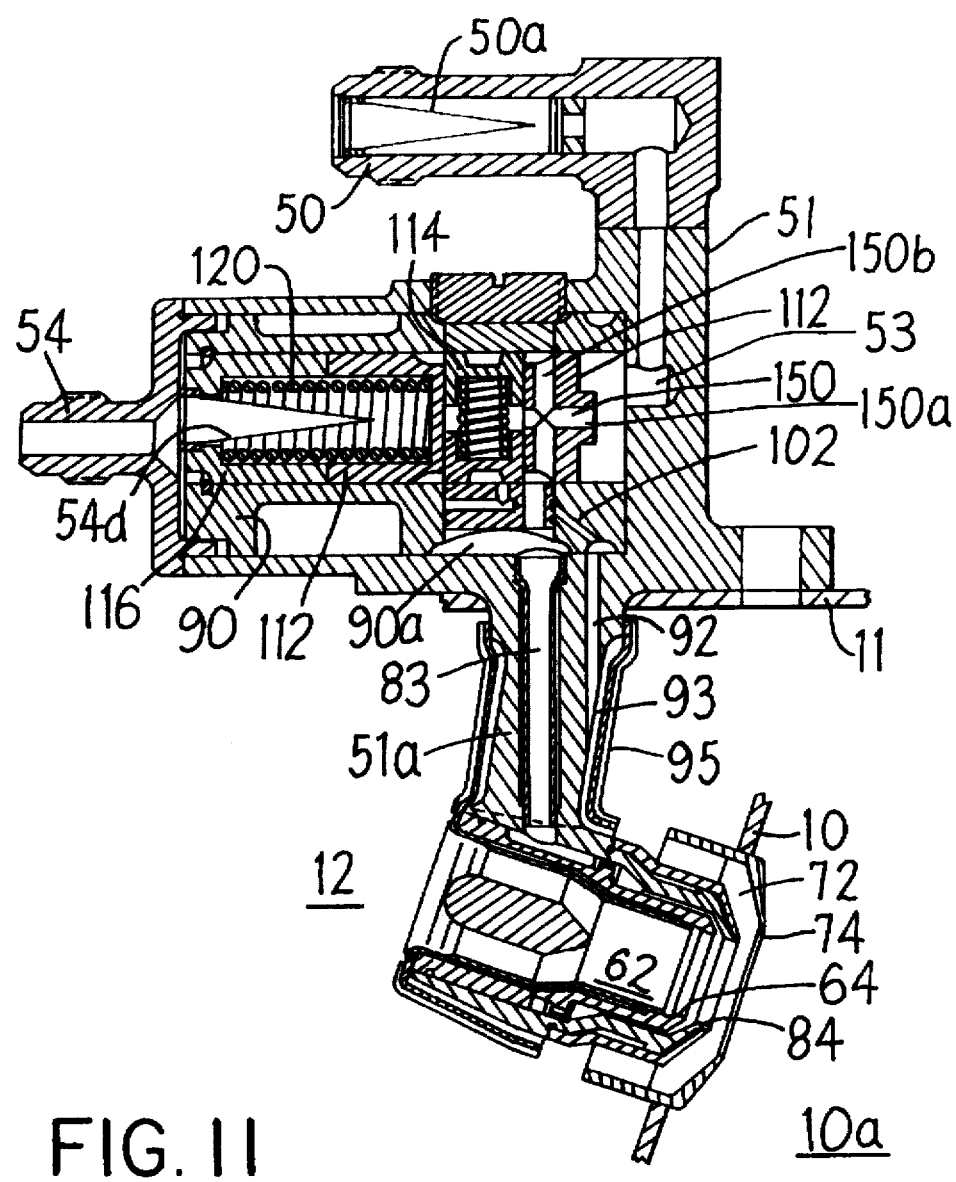
FIG. 11 is a sectional view of a secondary (main) fuel injector useful in practicing the invention and showing the purge valve in a fuel injection position.

The three-way servo-controlled valve SC of FIGS. 8-9 functions as a pilot valve to switch the shuttle valve 110 between the fuel injection position, FIG. 11, and a fuel purging position. In particular, the FADEC system (not shown) instructs the valve SC to supply relatively low fuel return pressure to port 54 and thus to the shuttle valve 110, while the relatively high fuel pressure at the splitter valve SP acts through valve SFDV at port 50 on the other end of the shuttle valve 110 against the sprng 120 and return pressure at port 54 to move the shuttle valve shoe 114 in the fuel injection position shown in FIG. 11. In the injection position, fuel supplied to port 50 flows through the outer axial end passage 150a through transverse, connected passage 150b to purge plate fuel passage 100d and then to chamber 90a for flow to the injector fuel tube 83.

On the other hand, a fuel purge command signal from the FADEC system instructs the splitter valve SP to provide a relatively low supply pressure at valve SFDV to the port 50 and thus to the shuttle valve 110 and against relatively high valve SC leakage pressure at port 54 to move the shoe 114 to the fuel purging position (to the right in FIG. 11 with the axial end passage 150a abutted and closed off against the wall of the housing 51). During the purge mode, a slight fuel leakage flow (see arrowheads in FIG. 9) is controlled by the splitter valve SP (as a metered portion of the pilot flow) to port 54. The bypass cooling flow passes through a gap between sleeve 116 and spool 112 through shuttle valve bypass recesses (not shown but similar to those described above) to bore 53. The bypass cooling fuel thereafter flows through the port 50 to the fuel distribution valve SFDV (through a fuel bypass thereof) to splitter valve SP as shown in FIG. 9 for discharge to the combustor via the pilot injector system. This provides a cooling flow to the shuttle valve 110 and the valve SFDV and maintains fuel manifolds M full of fuel. The fuel supply is prevented from directly communicating with the purge passages as a result of the normally closed spring 120 moving the shuttle valve 110 to the purging position after engine shut-down, sealing the injector SI from its fuel manifold.

Although the invention has been described in terms of specific embodiments thereof, it is not intended to be limited thereto but but rather only to the extent set forth hereafter in the claims which follow:

I claim:

1. A fuel injection system for a gas turbine engine combustion chamber, comprising
   at least one pilot fuel injector communicated to said combustion chamber for discharging fuel thereto,
   at least one secondary fuel injector having a fuel discharge passage communicated to said combustion chamber for discharging fuel thereto and a fuel purging passage communicated to a purge air source,
   fuel flow control means for supplying fuel flow to said pilot fuel injector under all regimes of engine operation and to said secondary fuel injector under regimes of engine operation requiring fuel flow above a selected level, and
   a purge valve movable between a first position to provide fuel flow between said fuel control means and said fuel discharge passage of said secondary fuel injector for fuel injection to said combustion chamber and to a second position to terminate said fuel flow and to communicate said fuel discharge passage of said secondary injector and said fuel purging passage to purge fuel from said fuel discharge passage to said combustion chamber, said purge valve being communicated at all times to pilot inlet fuel pressure and biased by spring means in a manner to position said shuttle valve at the second purging position when fuel flow to said secondary injector is controlled below said selected level and being communicated to secondary fuel inlet pressure when fuel flow exceeds said selected level such that said secondary fuel pressure on said shuttle valve overcomes said pilot fuel inlet pressure and said spring means to position said shuttle valve at the first injection position.

2. The fuel injection system of claim 1 wherein said purging passage communicates to a purge air pressure source upstream of said combustion chamber.

3. The fuel injection system of claim 1 wherein said pilot fuel pressure is communicated to a first end region of said shuttle valve and said secondary fuel pressure is communicated to a second, opposite end region of said shuttle valve.

4. The fuel injection system of claim 3 wherein said spring means engages said first end region of said shuttle valve.

5. The fuel injection system of claim 1 wherein said fuel control means comprises fuel splitter means for proportioning fuel flow between said pilot injector and said secondary injector.

6. The fuel injection system of claim 1 wherein said purge valve includes fuel bypass means communicated to said pilot fuel injector to provide a small cooling fuel flow through the secondary fuel injector to the pilot injector when said purge valve is positioned in the second purging position.

7. The fuel injection system of claim 1 further including a plurality of pairs of said pilot and secondary injectors, a pilot fuel distribution valve for distributing pilot fuel among said pilot fuel injectors, and a secondary fuel distribution valve for distributing fuel to said secondary fuel injectors.

8. The fuel injection system of claim 1 wherein said purge valve comprises a movable shuttle valve disposed in a valve body, said shuttle and body being in metal-to-metal sealing relation without resilent seals.

9. The fuel injection system of claim 8 wherein said purge passage extends through said valve body in communication with said purge air source.

10. The fuel injection system of claim 9 wherein said purge passage communicates to a space between said body and a body heat shield to communicate to said purge air source.

11. The fuel injection system of claim 1 wherein a fuel inlet of said pilot injector is communicated to said shuttle valve.

12. A fuel injector for a gas turbine engine, comprising:
   injector housing means having a fuel discharge passage communicated to a combustion chamber and a fuel purge passage communicated to a source of purge air,
   a shuttle valve disposed in said housing means and movable to a first fuel injection position where said fuel discharge passage is communicated to a source of fuel and said purge passage is prevented by said shuttle valve from communicating with said fuel discharge passage, and a second fuel purging position where said fuel discharge passage and said purge passage are communicated by said shuttle valve to purge fuel residing in said fuel discharge passage to said combustion chamber,
   spring means for biasing said shuttle valve toward said second purging position, and
   fuel port means at which fuel pressure is applied on said shuttle valve counter to said spring means to move said shuttle valve toward said fuel injection position.

13. The fuel injector of claim 12 wherein said shuttle valve includes a sealing shoe in metal-to-metal contact with a valve sleeve and movable relative to a fuel passage or purge passage in the valve sleeve.

14. The fuel injector of claim 12 includng a fuel bypass passage for cooling fuel flow when said shuttle valve is in said fuel purging position.

15. The fuel injector of claim 12 wherein said spring means is disposed between a stationary sleeve and movable shuttle valve spool.

* * * * *

UNITED STATES PATENT AND TRADEMARK OFFICE
CERTIFICATE OF CORRECTION

PATENT NO. : 5 735 117
DATED     : April 7, 1998
INVENTOR(S) : Alvin D. TOELLE

It is certified that error appears in the above-indentified patent and that said Letters Patent is hereby corrected as shown below:

Column 9, line 56; replace "shuttle" with ---purge---.
          line 61; replace "shuttle" with ---purge---.
          line 63; replace "shuttle" with ---purge---.

Column 10, line 3; replace "shuttle" with ---purge---.
           line 4; replace "shuttle" with ---purge---.
           line 6; replace "shuttle" with ---purge---.

Signed and Sealed this

Twenty-eighth Day of July, 1998

Attest:

BRUCE LEHMAN

*Attesting Officer*        *Commissioner of Patents and Trademarks*